F. E. BOARDMAN.
COFFEE POT.
APPLICATION FILED NOV. 18, 1915.
1,250,547.
Patented Dec. 18, 1917.
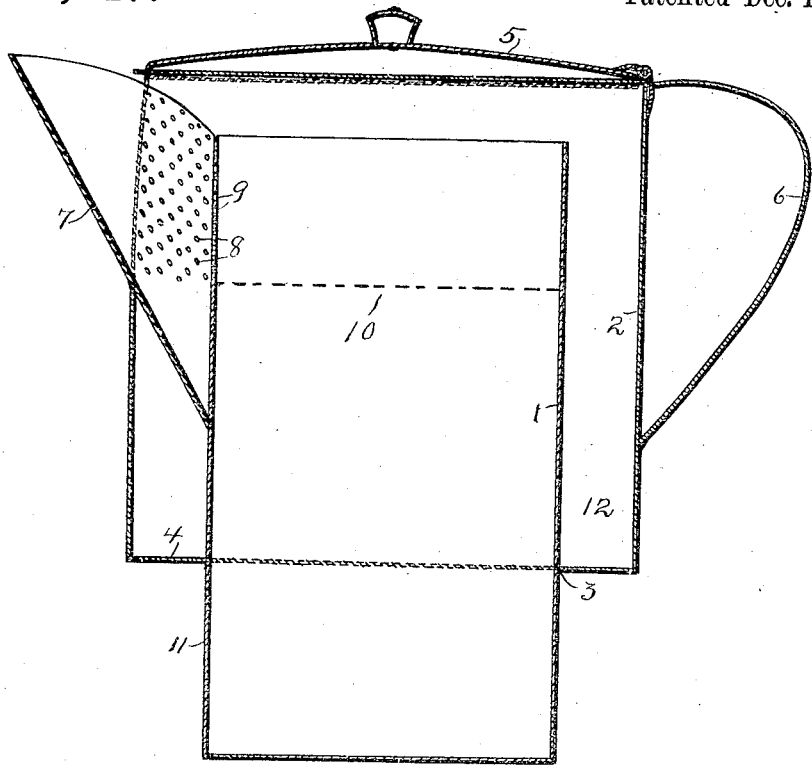
INVENTOR
Frederick E. Boardman
BY
Arthur Phelps Marr
ATTORNEY

UNITED STATES PATENT OFFICE.

FREDERICK E. BOARDMAN, OF BROOKLYN, NEW YORK.

COFFEE-POT.

1,250,547.	Specification of Letters Patent.	Patented Dec. 18, 1917.

Application filed November 18, 1915. Serial No. 62,102.

*To all whom it may concern:*

Be it known that I, FREDERICK ELLIOTT BOARDMAN, a citizen of the United States, and resident of the borough of Brooklyn, county of Kings, city and State of New York, have invented certain new and useful Improvements in Coffee-Pots, of which the following is a specification.

The invention relates to a coffee pot constructed in a manner so as to have certain novel and important features. The novel features are not merely decorative effects, as is often the case with devices as well known as coffee pots, but in this instance they have to do with the production of a pot or urn that may be used in an ordinary manner and yet one from which will be absent certain objectionable features.

I have found that in using an ordinary coffee pot, it has been for a long time customary to place in the pot a quantity of ground or pulverized coffee together with a desirable amount of cold water. The pot is then placed upon a stove or other suitable heating device where the heat is applied. As the water heats it expands and when the boiling point of the water has been reached, the coffee boils with the water. The boiling of water containing coffee is accompanied by violent ebullition with the result that unless closely watched the coffee or the contents of the pot will boil over on to the stove or heating device, and not only will the contents be lost, but the heating device will be soiled or made unsightly.

The boiling over of a coffee pot or urn is a serious matter particularly if gas is used as the heating means. Not only is the average gas stove so constructed that it cannot without difficulty be cleaned but the boiling over of the coffee may extinguish the gas flame allowing unburned gas to escape.

My invention then has to do with the construction of a coffee pot, the contents of which cannot boil out of the pot. The construction and operation will be set forth as the specification progresses.

The following is what I consider a good means of carrying out this invention and, The accompanyng drawings should be referred to for a complete understanding of the specification which follows:—

The drawing shows in a single figure a central vertical section.

Similar reference numerals indicate like parts in all figures where they appear.

I have called attention to the fact that this invention relates to coffee pots and I now desire to set forth that my pot is used in the manner that ordinary coffee pots are used.

My device consists of an interior cylindrical member indicated at 1, of a size as shall be desired and sufficiently large to receive a desirable amount of liquid.

This cylindrical member may be made of block tin, or iron, nickel plated or enameled, or of any other suitable material, and I prefer that it should be in the shape of an extended cylinder.

Surrounding the cylinder 1 is a larger and shorter cylinder 2 made of similar material as cylinder 1 and attached thereto by soldering or otherwise at a point above the lower end of the cylinder 1 but below the mid height of that cylinder. The usual point of attachment is indicated at 3.

The inner cylinder has its lower end closed and the outer cylinder is also provided with a bottom in the form of a ring 4.

In the upper open end of the outer cylinder, I may arrange a cover 5, and to one side of this cylinder a handle 6 is secured. These members perform ordinary functions that will be understood from their titles.

Entering the outer cylinder and at a point opposite the handle 6 is a spout 7, arranged at an angle and continuing inward and opening into the inner cylinder 1. Although the outer portion of the spout is solid and only opened at its upper end the inner portion of this member, that portion which is between the inner and outer cylinders is provided with a plurality of perforations as indicated at 8, and I also provide perforations 9 through the wall of the cylinder 1 and by means of which liquid may pass from the inner cylinder into the spout 7.

In operating my device a quantity of suitably prepared coffee and cold water are placed in the inner cylinder, the water being brought up to the line 10 or above or below this line as requirements may dictate.

My device is next subjected to heat, the heat being applied to the lower portion 11 of the inner cylinder.

The coffee is allowed to reach the boiling point and if boiling takes place, the coffee and liquid will pass upward out of the inner cylinder into the space 12 between the inner and outer cylinders, and I have found that a long and extended application of heat will not cause the coffee or the liquid contained in my coffee pot to boil out of the pot. This is important as it develops the principle that I have labored to accomplish, the production of a coffee pot that may be safely operated without requiring constant attention.

It is obvious that sizes and proportions may be changed at will and that my device may be made more or less decorative as desired, and that other modifications may be made within the scope of the appended claims without departing from the principle or sacrificing the advantages of the invention.

Having carefully and fully described my invention, what I claim and desire to secure by Letters Patent is:

1. A coffee pot comprising a plurality of cylindrical members one within the other and an angularly disposed spout secured to the inner cylindrical member and projecting through the outer cylindrical member, said spout being perforated between the said cylindrical members as herein specified.

2. A coffee pot comprising a cylindrical member a smaller cylindrical member within said first cylindrical member and projecting therefrom and providing a chamber between said cylindrical members, a spout passing through the wall of the larger cylindrical member and connecting with the wall of the smaller cylindrical member, the said spout being provided with a plurality of perforations in that portion which extends between the walls of said cylindrical members.

3. A coffee pot comprising an inner cylinder, an outer cylinder of larger diameter and secured to said inner cylinder at a point above the lower end thereof, a disk closing the lower end of said outer cylinder and surrounding said inner cylinder and a spout secured to the inner cylinder and projecting through said outer cylinder, said spout being perforated between the said cylinders as herein specified.

Signed at New York city, county and State of New York, this 28th day of Oct., 1915, in the presence of two witnesses.

F. E. BOARDMAN.

Witnesses:
G. E. S. MARR,
ARTHUR PHELPS MARR.

Copies of this patent may be obtained for five cents each, by addressing the "Commissioner of Patents, Washington, D. C."